United States Patent [19]

Sapitowicz et al.

[11] Patent Number: 4,647,949

[45] Date of Patent: Mar. 3, 1987

[54] NON-IMPACT SPARK JET PRINT HEAD

[75] Inventors: Thomas P. Sapitowicz, Bel Air; Gerald S. Stevens, Jr., Forest Hill, both of Md.

[73] Assignee: General Instrument Corporation, New York, N.Y.

[21] Appl. No.: 803,344

[22] Filed: Dec. 2, 1985

[51] Int. Cl.[4] .............................................. G01D 15/18

[52] U.S. Cl. ................................. 346/140 R; 400/126

[58] Field of Search .......................... 346/140, 75, 1.1; 400/126

[56] References Cited

U.S. PATENT DOCUMENTS

| | | | |
|---|---|---|---|
| 2,173,743 | 9/1939 | Wise | 346/140 X |
| 4,238,807 | 12/1980 | Bovio | 346/140 |
| 4,332,487 | 6/1982 | Bovio | 400/126 |
| 4,349,829 | 9/1982 | Bovio | 346/140 |
| 4,432,003 | 2/1984 | Barbero | 346/140 |

*Primary Examiner*—Joseph W. Hartary
*Attorney, Agent, or Firm*—James & Franklin

[57] ABSTRACT

A housing defines a reservoir containing a flowable, electrically conductive ink, which may be a liquid or powder. The housing includes a printing surface in the form of a non-conductive face plate having a plurality of spaced orifices. A plurality of electrically isolated conductive electrodes are associated with the face plate, and located adjacent the various orifices. An impeller, situated behind the face plate, is rotated to distribute the ink to the orifices. A spring-loaded piston member maintains the ink in the reservoir under pressure. An electrical source is connected between the ink and selected electrodes to cause the ink to be ejected through the orifices adjacent the selected electrodes and onto a paper strip proximate the face plate to imprint dots thereon.

11 Claims, 4 Drawing Figures

NON-IMPACT SPARK JET PRINT HEAD

The present invention relates to dot matrix printers and, more particularly, to a non-impact spark jet print head which utilizes a flowable conductive ink and includes a high capacity reservoir therefor.

Non-impact spark jet print devices are known in the art, and are described in U.S. Pat. No. 4,349,829 entitled "Non-Impact Printing Method" issued Sept. 14, 1982; U.S. Pat. No. 4,332,487 entitled "Solid Ink Cartridge For Non-Impact Printer" issued June 1, 1982; U.S. Pat. No. 4,238,807 entitled "Non-Impact Printing Device" issued Dec. 9, 1980. These patents describe a non-impact printing device with selective emission of solid ink particles. A rod of solid ink is pressed by a spring in an insulating housing against the end wall with a nozzle therein. A pulsed, high voltage applied between the ink rod and a counter electrode causes ink particles to be eroded from the solid rod and ejected through the nozzle onto the paper. The paper and printing device are moved relative to each other such that selective control of the high voltage pulsing can be used to form characters by a dot matrix technique.

A major drawback to a printer utilizing the solid ink construction described in the above-identified patents is the cost of the disposable tube and ink rod assembly. Commercial embodiments of this device contain an ink rod of about two millimeters in diameter and about 20 millimeters long. This is sufficient to print approximately 150,000 characters. For certain applications, such as the printing of betting tickets for parimutuel wagering, each ticket may contain approximately 200 characters. Hence, the prior art solid rod assemblies must be replaced frequently, resulting in a relatively high cost for printing the tickets. Even if the solid ink rods could be made longer and the diameter increased, the cost of such devices still could not be brought down to the printing costs associated with conventional ribbon-type impact printers.

It is a general object of the present invention to provide a non-impact spark jet print head which can be operated at greatly reduced cost. This object is achieved by eliminating the necessity for a plurality of individual solid ink rod assemblies which must be replaced frequently by utilizing a flowable liquid or powder conductive ink which can be retained in a large capacity reservoir. The reservoir is used to feed ink to a matrix array of ejection orifices which are located on a single plate.

It is, therefore, a prime object of the present invention to provide a non-impact spark jet print head which can be operated at greatly reduced cost.

It is another object of the present invention to provide a non-impact spark jet print head which utilizes flowable conductive ink composed of a liquid or powder.

It is another object of the present invention to provide a non-impact spark jet print head which has a large ink storage capacity.

It is another object of the present invention to provide a non-impact spark jet print head wherein individual spark jet print assemblies are replaced by a single structure having a plurality of ejection orifices.

It is another object of the present invention to provide a non-impact spark jet print head with means for distributing ink to the ejection orifices.

It is another object of the present invention to provide a non-impact spark jet print head wherein the ink is maintained under a slight hydraulic pressure.

In accordance with the present invention, a non-impact spark jet print head is provided comprising a housing defining a reservoir, adapted to contain a flowable, electrically conductive ink. The housing includes a non-conductive face plate. The face plate has a plurality of spaced orifices terminating at the exterior surface thereof. A plurality of electrically isolated conductive electrodes are situated in the face plate at points adjacent different orifices. Means, situated within the reservoir behind the plate, is provided for distributing ink to the orifices. Means are provided for maintaining the ink under pressure. Electrical source means are provided having first and second outputs. Means are provided for operably electrically connecting the first output to the ink. Means are provided for operably electrically connecting selected ones of the conductive electrodes to the second source output.

The distributing means comprises an impeller and means for rotating the impeller. The face plate has an internal surface and the impeller is situated proximate the internal surface of the face plate.

The pressure maintaining means comprises a piston member. Means are provided for spring loading the piston member to maintain the ink under pressure.

The face plate comprises a ceramic substrate and a layer of insulating material such as Teflon. The conductive electrodes are situated on the ceramic substrate.

The ink is preferably a heavy liquid comprising carbon black and waxes. The ink may also preferably be a dry powder comprising carbon black and binder particles. The particles of the powder are preferably approximately 0.2 mm in diameter.

To these and to such other objects which may hereinafter appear, the present invention relates to a non-impact spark jet print head, as described in the following specification and recited in the annexed claims, taken together with the accompanying drawings, wherein like numerals refer to like parts, and in which:

Figure 1:
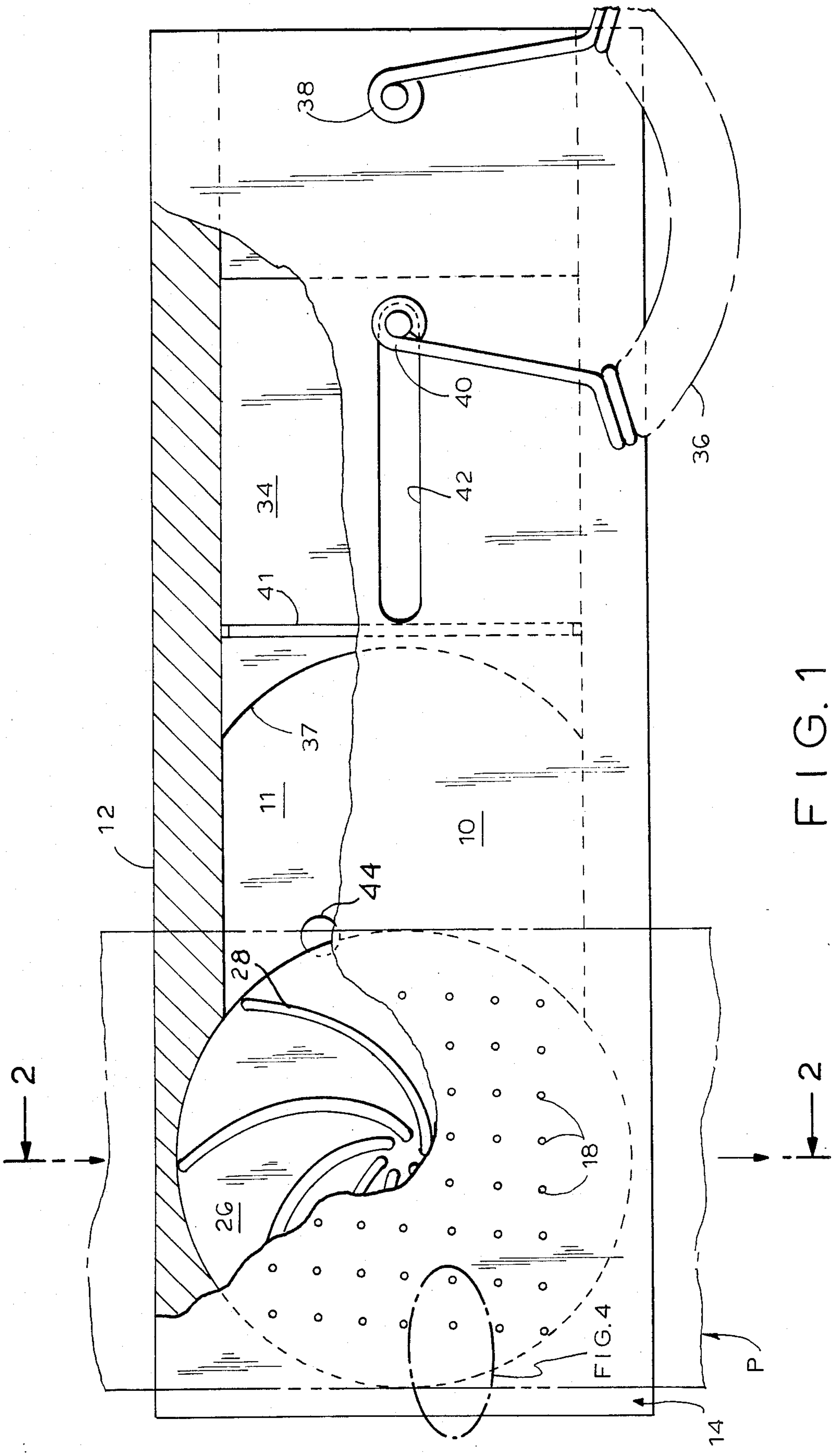
FIG. 1 is a front view of the non-impact spark jet print head of the present invention.

As seen in the drawings, the non-impact spark jet print head of the present invention comprises a non-conductive housing 10 with an enlarged front end 12 defining an ink reservoir 11 of relatively large capacity. A face plate 14 is mounted along end 12, in front of reservoir 11.

Figure 3:
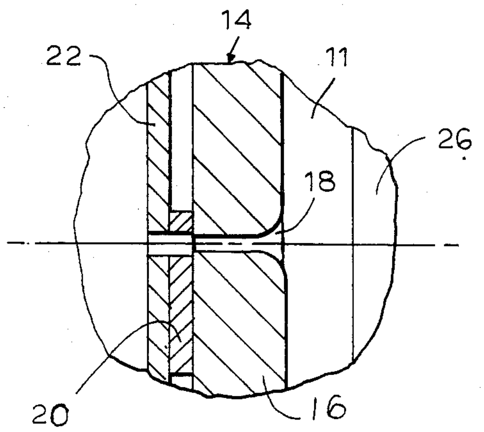
FIG. 3 is an enlarged cross-sectional view of a portion of the face plate of the non-impact spark jet print head of the present invention.
Figure 4:
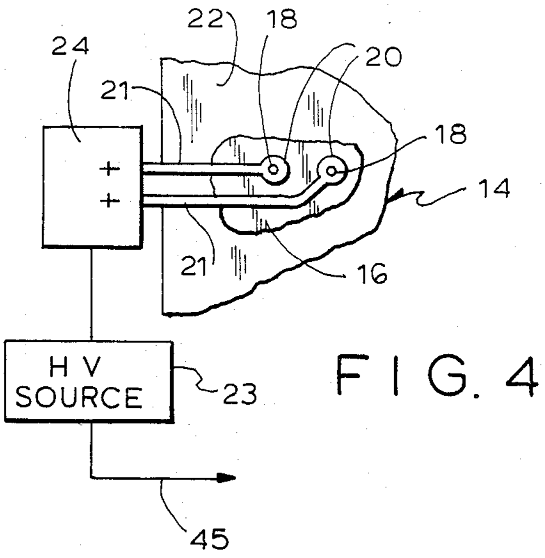
FIG. 4 is an enlarged view of a section of the surface of the face plate of the non-impact spark jet print head of the present invention.

As best seen in FIG. 3, face plate 14 comprises a ceramic substrate 16. An array of ejection orifices 18 having generally conical shapes, are machined through substrate 16. The orifices have approximately a 0.10 mm diameter. The external surface of substrate 16 is provided with a copper layer which is etched to form individual electrodes 20 surrounding each orifice 18 and leads 21, as seen in FIG. 4. The external surface of the face plate (facing paper P to be imprinted) is coated with an electrically insulating material 22 such as Teflon.

As seen in FIG. 4, each of the electrodes 20 is individually connected, by means of a different lead 21, to the positive output of a pulsed electrical high voltage source 23 of approximately 4,000 volts through a commutation device 24. Device 24 acts to select particular conductive electrodes 20 for connection to the positive output of electrical source 23 and may comprise a plurality of electrically actuated switching devices or the like.

Situated within the enlarged end 12 of housing 10, at a point spaced behind the interior surface of face plate 14, and within ink reservoir 11, is a rotatable impeller 26 having a plurality of curved blades 28. Impeller 26 is slowly rotated by means of a DC gear motor 30 situated at the opposite end of housing 10. Motor 30 is connected to impeller 26 through a coupling 32. Bearings 33 support the shaft 35 connecting the coupling 32 and the impeller 26 on housing 10. Seal 39 protects bearings 33 from the ink in reservoir 11.

A piston member or ram 34 is situated within reservoir 11, as seen in FIG. 1. Member 34 has a concave forward end 37 to accommodate the circular impeller 26 and a generally rectangular cross section. Member 34 is spring loaded by a constant force spring 36 to maintain the ink within the reservoir 11 under a slight hydraulic pressure. Spring 36 is connected at one end 38 to the exterior of the housing, and at the other end 40 through a slot 42 in the housing wall to member 34. A seal 41 is provided to seal reservoir 11 from the portion of housing IO within which member 34 moves.

Figure 2:
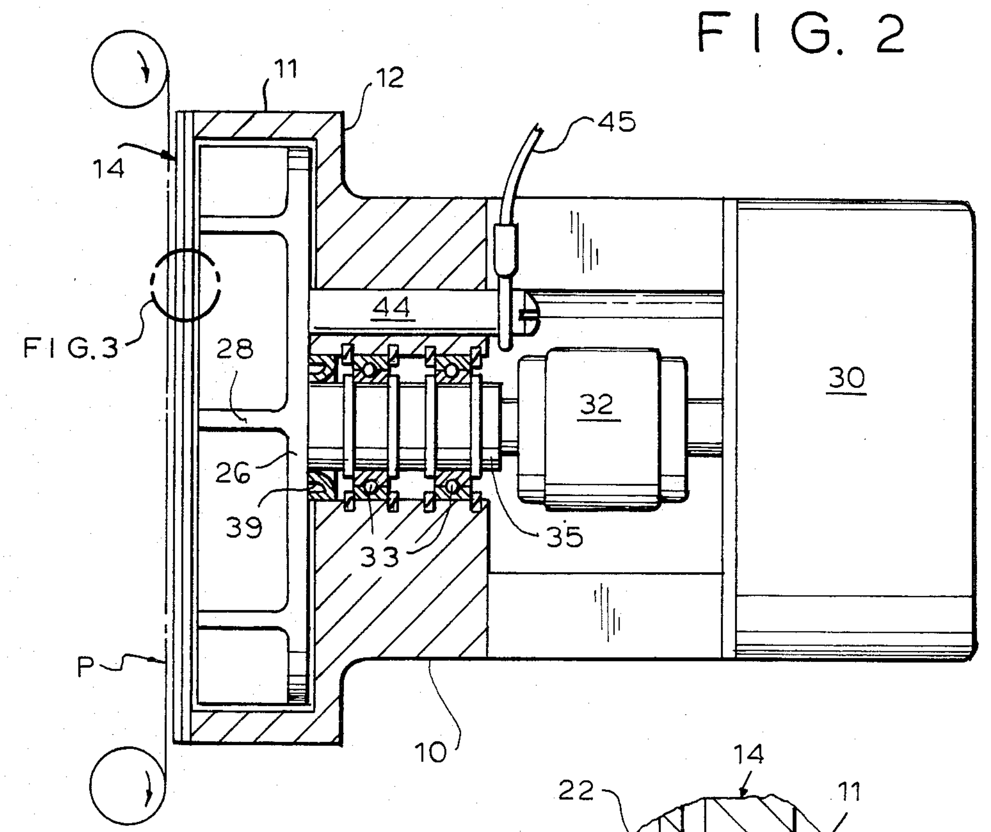
FIG. 2 is a side plan view of the non-impact spark jet print head of the present invention, taken along line 2—2 of FIG. 1.

A terminal 44 in the interior of housing 10 (FIG. 2) is operably electrically connected to the negative output of the electrical source 23 by a lead 45. In this manner, the negative output of source 23 is electrically connected to the conductive ink which fills reservoir 11 within housing 10, including the spaces between the veins 28 of impeller 26 and the space between impeller 26 and face plate 14. The slowly rotating impeller 26, driven by DC motor 30, evenly distributes the ink into orifices 18. The ink is under a slight hydraulic pressure caused by the spring-loaded member 34 to further maintain even distribution of the ink.

As the paper P is moved relative to the external surface of face plate 14, commutation means 24 energizes selected electrodes 20. This causes ink to be ejected through the selected orifices 18, forming dots on the paper P. By appropriately moving paper P relative to the face plate 14 and by selecting particular electrodes 20 for energization, dots may be imprinted on the paper forming various characters and the like.

The conductive ink may be a heavy fluid containing carbon black and waxes. The waxes and the ink are chosen such that the cohesion of the liquid is greater than the adhesion of the liquid to the surfaces of ceramic substrate 16 of the face plate 14. Hence, no wetting or capillary flow into the orifices 18 occurs, despite the hydraulic pressure.

The capacity of the ink reservoir is such that approximately 300,000 tickets, requiring approximately 200 characters each, may be printed before refilling is required. Thus, the reservoir contains an equivalent of approximately 8 to 10 conventional ink ribbons or the equivalent of approximately 400 disposable solid ink assemblies of the type disclosed in the previously identified patents.

The ink need not be a liquid. A dry powder of carbon black and binder particles may be used. The particle size in this instance should be in the order of 0.2 mm. Such a particle size would minimize sealing problems.

It should now be appreciated that the present invention relates to a non-impact spark jet print head utilizable with liquid or powder ink which may be retained in a relatively large capacity reservoir. The ink is maintained under a slight hydraulic pressure and is distributed to a matrix array of ejection orifices situated on a laminated face plate by means of a slowly rotating impeller situated behind the face plate. The impeller is rotated by a DC motor through the necessary reduction gearing. In this manner, the use of a plurality of solid rod ink assemblies, conventional in the prior art, is eliminated, as is the necessity to frequently replace same. Accordingly, the operating costs of the non-impact spark jet print head of the present invention are greatly reduced as compared to heads utilizing disposable solid ink assemblies.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims:

We claim:

1. A non-impact spark jet print head comprising a housing defining a cavity adapted to contain a flowable, electrically conductive ink, said housing comprising a non-conductive face plate having a plurality of spaced orifices terminating at the exterior surface thereof, a plurality of electrically isolated conductive elements situated proximate said external surface at points adjacent different ones of said orifices, impeller means situated proximate the internal surface of said faceplate, means for rotating said impeller means, means for maintaining the ink under pressure, electrical source means having first and second outputs, means for operably electrically connecting said first output to the ink and means for operably electrically connecting selected ones of said conductive elements to said second output.

2. The head of claim 1, wherein said rotating means comprises a motor.

3. The head of claim 1, wherein said pressure maintaining means comprises a piston member and means for spring loading said piston member.

4. The head of claim 1, wherein said face plate comprises a ceramic substrate.

5. The head of claim 4, wherein said face plate further comprises a layer of insulating material.

6. The head of claim 5, wherein said insulating layer comprises Teflon.

7. The head of claim 4, wherein said elements are situated on said ceramic substrate.

8. The head of claim 1, wherein said ink is a heavy liquid comprising carbon black and waxes.

9. The head of claim 1, wherein said ink is a dry powder.

10. The head of claim 9, wherein said powder comprises carbon black and binder particles.

11. The head of claim 10, wherein said particles have a size of approximately 0.2 mm.

* * * * *